United States Patent
Kim et al.

(10) Patent No.: US 11,284,351 B2
(45) Date of Patent: Mar. 22, 2022

(54) ELECTRONIC DEVICE AND OPERATING METHOD THEREOF

(71) Applicant: SAMSUNG ELECTRONICS CO., LTD., Suwon-si (KR)

(72) Inventors: Jinho Kim, Suwon-si (KR); Deoknam Kim, Suwon-si (KR); Sangu Shim, Suwon-si (KR); Sukun Yoon, Suwon-si (KR); Cheulhee Hahm, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/899,895

(22) Filed: Jun. 12, 2020

(65) Prior Publication Data

US 2021/0037472 A1 Feb. 4, 2021

(30) Foreign Application Priority Data

Jul. 30, 2019 (KR) ........................ 10-2019-0092656

(51) Int. Cl.
*H04W 52/02* (2009.01)
*H04W 76/10* (2018.01)
(Continued)

(52) U.S. Cl.
CPC ......... *H04W 52/0235* (2013.01); *H04L 67/12* (2013.01); *H04W 52/0222* (2013.01);
(Continued)

(58) Field of Classification Search
None
See application file for complete search history.

(56) References Cited

U.S. PATENT DOCUMENTS

| 6,760,853 B2 | 7/2004 | Murakami |
| 7,715,334 B2 | 5/2010 | Harsch |

(Continued)

FOREIGN PATENT DOCUMENTS

| JP | 2001-168937 | 6/2001 |
| KR | 10-1377376 | 3/2014 |

(Continued)

OTHER PUBLICATIONS

International Search Report and Written Opinion dated Oct. 7, 2020 in counterpart International Patent Application No. PCT/KR2020/008087.

*Primary Examiner* — Diane L Lo
(74) *Attorney, Agent, or Firm* — Nixon & Vanderhye P.C.

(57) ABSTRACT

An electronic device includes: a communicator comprising communication circuitry configured to communicate with a server, a memory storing one or more instructions, and a processor configured to execute the one or more instructions stored in the memory to: set an operation according to a connection release of the communicator to be skipped based on receiving first operation mode change information in a normal mode and enter a suspend mode from the normal mode, skip the operation according to the connection release based on receiving connection release information from the communicator in the suspend mode, and switch from the suspend mode to the normal mode based on receiving second operation mode change information after receiving the connection release information from the communicator and release setting to skip the operation according to the connection release of the communicator in the normal mode.

20 Claims, 9 Drawing Sheets

(51) Int. Cl.
*H04L 29/08* (2006.01)
*H04W 76/25* (2018.01)
*H04W 80/06* (2009.01)
*H04W 80/04* (2009.01)
*H04L 67/12* (2022.01)
*G16Y 40/30* (2020.01)

(52) U.S. Cl.
CPC ....... *H04W 52/0274* (2013.01); *H04W 76/10* (2018.02); *H04W 76/25* (2018.02); *G16Y 40/30* (2020.01); *H04W 80/04* (2013.01); *H04W 80/06* (2013.01)

(56) References Cited

U.S. PATENT DOCUMENTS

| | | | |
|---|---|---|---|
| 8,688,826 B2 | 4/2014 | Black et al. | |
| 8,904,206 B2 | 12/2014 | Black et al. | |
| 9,749,420 B2 | 8/2017 | Malik et al. | |
| 10,045,297 B1* | 8/2018 | Shmidt | H04W 52/028 |
| 2012/0036381 A1* | 2/2012 | Masuda | G06F 1/3203 |
| | | | 713/323 |
| 2012/0119577 A1 | 5/2012 | Clarke | |
| 2014/0258465 A1 | 9/2014 | Li | |
| 2015/0036576 A1 | 2/2015 | Jafarian et al. | |
| 2015/0295600 A1* | 10/2015 | King | H04B 1/44 |
| | | | 455/78 |
| 2017/0099636 A1 | 4/2017 | Arunachalam et al. | |
| 2020/0404589 A1* | 12/2020 | Wang | H04W 52/0235 |

FOREIGN PATENT DOCUMENTS

| | | |
|---|---|---|
| KR | 10-1508045 | 4/2015 |
| KR | 10-2018-0021716 | 3/2018 |
| KR | 10-2018-0099143 | 9/2018 |

* cited by examiner

ELECTRONIC DEVICE AND OPERATING METHOD THEREOF

CROSS-REFERENCE TO RELATED APPLICATION

This application is based on and claims priority under 35 U.S.C. § 119 to Korean Patent Application No. 10-2019-0092656, filed on Jul. 30, 2019, in the Korean Intellectual Property Office, the disclosure of which is incorporated by reference herein in its entirety.

BACKGROUND

1. Field

The disclosure relates to an electronic device and an operating method of the electronic device, and for example, to an electronic device capable of receiving a power-on packet and performing a power-on operation, even when power is turned off, and an operating method of the electronic device.

2. Description of Related Art

The Internet of Things (IoT) refers to interrelated objects (for example, electronic devices, etc.) such as display devices such as televisions (TVs), smartphones, personal computers (PCs), automobiles, refrigerators, washing machines, and watches connected to a wireless network. With the IoT, it is possible for a plurality of electronic devices to transmit and receive data, and process the data to be automatically driven. For example, a user may control a TV in the house using a smartphone outside the house.

To implement an IoT environment, an electronic device equipped with an IoT function generally establishes a communication session with an IoT cloud server and performs an operation for maintaining a connection between the electronic device and the server through the communication session.

When an electronic device having an IoT function is powered off and then receives a power-on packet, a situation in which a transmission control protocol (TCP) session is terminated may occur according to a down/up event of a network link, and thus, the power-on packet may not be normally received.

SUMMARY

Embodiments of the disclosure an electronic device capable of performing a power-on operation by normally receiving a power-on packet in a power-off state and an operating method of the electronic device.

Additional aspects will be set forth in part in the description which follows and, in part, will be apparent from the description.

According to an example embodiment of the disclosure, an electronic device includes: a communicator comprising communication circuitry configured to communicate with a server, a memory storing one or more instructions, and a processor configured to execute the one or more instructions stored in the memory to: set an operation according to a connection release of the communicator to be skipped based on receiving first operation mode change information in a normal mode and enter a suspend mode from the normal mode, skip the operation according to the connection release based on receiving connection release information from the communicator in the suspend mode, switch from the suspend mode to the normal mode based on receiving second operation mode change information after receiving the connection release information from the communicator and release the setting to skip the operation according to the connection release of the communicator in the normal mode.

The processor may be further configured to execute the one or more instruction to establish a transmission control protocol (TCP) session with the server using a transmission control protocol/Internet protocol (TCP/IP) in the normal mode, and the communicator may be further configured to perform an operation of maintaining the TCP session and receive a power-on packet from the server through the TCP session, in the suspend mode.

The connection release of the communicator may include occurrence of a link down/up event of the communicator, wherein the processor may be further configured to maintain the TCP session by skipping an operation according to the link down/up event of the communicator.

The processor may be further configured to execute the one or more instruction to maintain the TCP session, by skipping a process of closing a TCP socket, based on the link down/up event of the communicator occurs.

The communicator may be further configured to transmit a wake-up signal to the processor based on receiving a power-on packet from the server in the suspend mode, and the processor may be further configured to resume execution of the one or more instructions based on the wake-up signal and control the communicator to be reset, and skip the operation according to the connection release based on receiving the connection release information according to the reset of the communicator.

The communicator may be further configured to receive the power-on packet retransmitted from the server, based on the reset being completed, and transmit the second operation mode change information to the processor, and the processor may be further configured to switch to the normal mode by performing a power-on operation based on receiving the second operation mode change information.

The processor may be further configured to execute the one or more instruction to cause the electronic device to transmit a response message to the server in response to receiving the second operation mode change information.

The electronic device may further include a display, wherein the processor may be further configured to execute the one or more instruction to determine whether to turn on the display, based on the second operation mode change information received from the communicator.

The processor may be further configured to execute the one or more instruction to terminate a TCP session with the server by performing a process of closing a TCP socket, based on the connection release of the communicator occurring in the normal mode.

According to an example embodiment of the disclosure, an operating method of an electronic device includes: receiving first operation mode change information in a normal mode; setting an operation according to a connection release of a communicator to be skipped in response to receiving the first operation mode change information, and entering a suspend mode from the normal mode; skipping the operation according to the connection release based on receiving connection release information from the communicator in the suspend mode; receiving, by a processor, second operation mode change information after receiving the connection release information; switching from the suspend mode to the normal mode in response to receiving the second operation mode change information; and releasing the setting to skip the operation according to the connection release in the normal mode.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
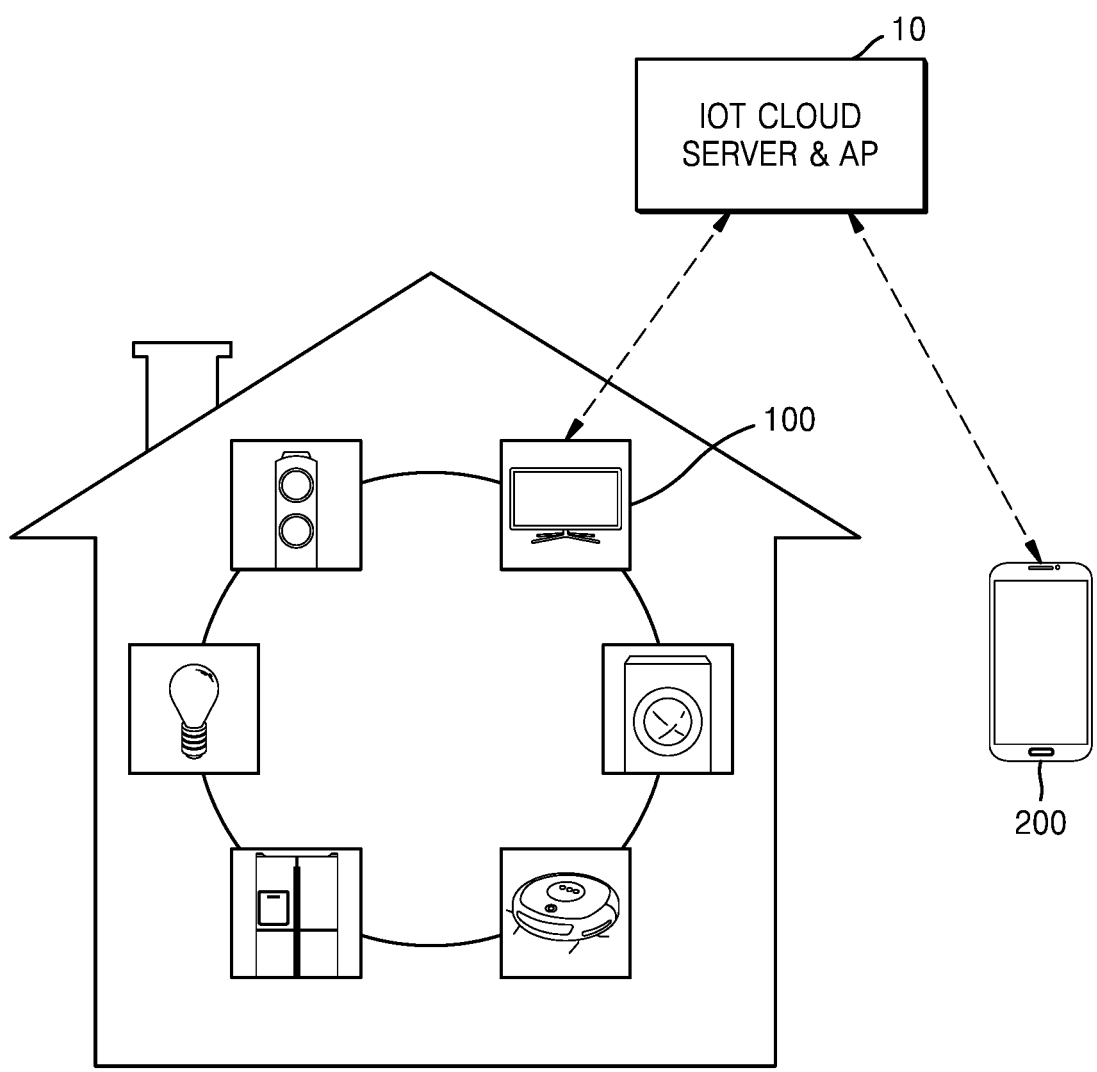
FIG. 1 is a diagram illustrating an example Internet of Things (IoT) system according to an embodiment of the disclosure.

Terms used in this disclosure will be briefly described, and the disclosure will be described in greater detail below.

Although general terms being widely used in the present disclosure were selected as terminology used in the disclosure while considering the functions of the disclosure, they may vary according to intentions of one of ordinary skill in the art, judicial precedents, the advent of new technologies, and the like. The disclosure may also use arbitrarily selected terms. In this case, their meanings will be described in detail in the detailed description of the disclosure or may be determined by the detailed description. Hence, the terms must be defined based on the meanings of the terms and the contents of the entire disclosure, not by simply stating the terms themselves.

Throughout the disclosure, the expression "at least one of a, b or c" indicates only a, only b, only c, both a and b, both a and c, both b and c, all of a, b, and c, or variations thereof.

It will be understood that when a certain part "includes" a certain component, the part does not exclude another component but can further include another component, unless the context clearly dictates otherwise. As used herein, the terms "unit", "module", or "unit" refers to a unit that can perform at least one function or operation, and may be implemented as hardware or software or as a combination of hardware and software.

Hereinafter, various example embodiments of the disclosure will be described in greater detail with reference to the accompanying drawings so that the disclosure may be readily implemented by one of ordinary skill in the technical field to which the disclosure pertains. However, the disclosure may be embodied in different forms and should not be construed as being limited to the example embodiments of the disclosure set forth herein. In the drawings, portions irrelevant to the description may not be shown or described in order to avoid obscuring the disclosure with unnecessary detail, and throughout the disclosure, similar components may be assigned like reference numerals.

FIG. 1 is a diagram illustrating an example Internet of Things (IoT) system according to an embodiment of the disclosure.

Referring to FIG. 1, the IoT system according to the embodiment of the disclosure may include an electronic device 100, an external device 200, and an IoT cloud and access point (AP) 10 connecting the electronic device 100 to the external device 200.

The electronic device 100 according to an embodiment of the disclosure may transmit and receive data to and from the external device 200 through a communication network.

For example, the electronic device 100 may be connected to at least one electronic device located adjacently, or may be connected to at least one electronic device located remotely. The electronic device 100 may transmit and receive certain data to and from at least one external device, be paired with at least one external device, remotely control at least one external device, or be remotely controlled by at least one external device.

The communication network according to an embodiment of the disclosure may be configured to include, for example, and without limitation, at least one of a wired communication network, a wireless communication network, or the like. For example, as the communication network used to implement the IoT, mobile communication (e.g., wireless broadband (Wibro), world interoperability for microwave access (Wimax), code division multiple access (CDMA), wideband CDMA (WCDMA), $3^{rd}$ generation (3G), 4G, or 5G), near field communication (NFC) (e.g., Bluetooth, wireless local area network (WLAN), or Wi-Fi), and/or low-power long-distance communication (e.g., television white space (TVWS) or weightless) may be used. However, it will be understood that the disclosure is not limited thereto.

Hereinafter, a case in which, in order to implement IoT environment, the electronic device 100 is interconnected with the external device 200 (e.g., a mobile device), which is remotely located, by a network using a transmission control protocol/Internet protocol (TCP/IP) communication protocol that is an Internet protocol will be described as a non-limiting example. For example, in the various example embodiments of the disclosure, a case in which an IoT platform is implemented using the TCP/IP communication protocol that is an Internet protocol will be described as a non-limiting example.

For example, when the electronic device 100 is located in a home and the external device 200 is located remotely from the home, the electronic device 100 and the external device 200 may be connected to each other through an Internet network and implement the IoT environment.

The electronic device 100 according to an embodiment of the disclosure may be implemented in various forms such as, for example, and without limitation, a television (TV), a mobile phone, a tablet personal computer (PC), a digital camera, a camcorder, a laptop computer, a desktop, an e-book terminal, a digital broadcasting terminal, a personal digital assistant (PDA), a portable multimedia player (PMP), a navigation system, an MP3 player, a wearable device, etc. In addition, the electronic device 100 according to the embodiment of the disclosure may include, for example, and without limitation, a household appliance such as a refrigerator, a washing machine, an air conditioner, a cleaner, a light bulb, an air purifier, or the like. Furthermore, the electronic device 100 may be a fixed electronic device placed at a fixed position or a mobile electronic device having a portable form, and may be a digital broadcast receiver capable of receiving digital broadcasts.

The external device 200 according to an embodiment of the disclosure may include, for example, a mobile computing device such as, for example, and without limitation, a wearable device, a smart phone, a tablet PC, a PDA, a laptop computer, a media player, a micro server, a global positioning system (GPS) device, or the like, but is not limited thereto.

In FIG. 1, a case in which the electronic device 100 is a display device and the external device 200 is a portable device will be described as a non-limiting example.

The electronic device 100 (hereinafter, referred to as 'display device 100') and the external device 200 (hereinafter, referred to as 'portable device 200') may be connected to each other by a home IoT platform. The display device 100 may be interconnected with the portable device 200 through a wireless communication network such as an Internet network. The display device 100 and the portable device 200 may be connected to each other through the IoT cloud and AP 10 that forms an IoT platform.

In this case, 'IoT cloud' may refer, for example, to a server, a cloud server, or a cloud server device that is interconnected with a plurality of electronic devices located remotely to support the IoT platform. In the various example embodiments of the disclosure, a server or device supporting the IoT platform is may be referred, to, for example, as 'IoT cloud server'.

'AP' may serve as a base station in a wireless LAN and may serve to connect a wired network and a wireless network. For example, the AP may serve as a bridge connecting a wireless LAN to which the display device 100 is connected and a mobile communication network connected to an IoT cloud server.

The display device 100 according to an embodiment of the disclosure may be operated under the control of the portable device 200. For example, a user (not shown) may be located remotely from the home. In this case, the user may want to perform a program recording operation by powering on the display device 100 located in the home using the portable device 200 carried by the user. In this case, the portable device 200 may transmit a signal requesting power-on to the display device 100 in response to a user input.

The IoT cloud and AP 10 may transmit a signal transmitted from the portable device 200 to the display device 100. This transmission operation will be described in greater detail below with reference to FIG. 2.

Figure 2:
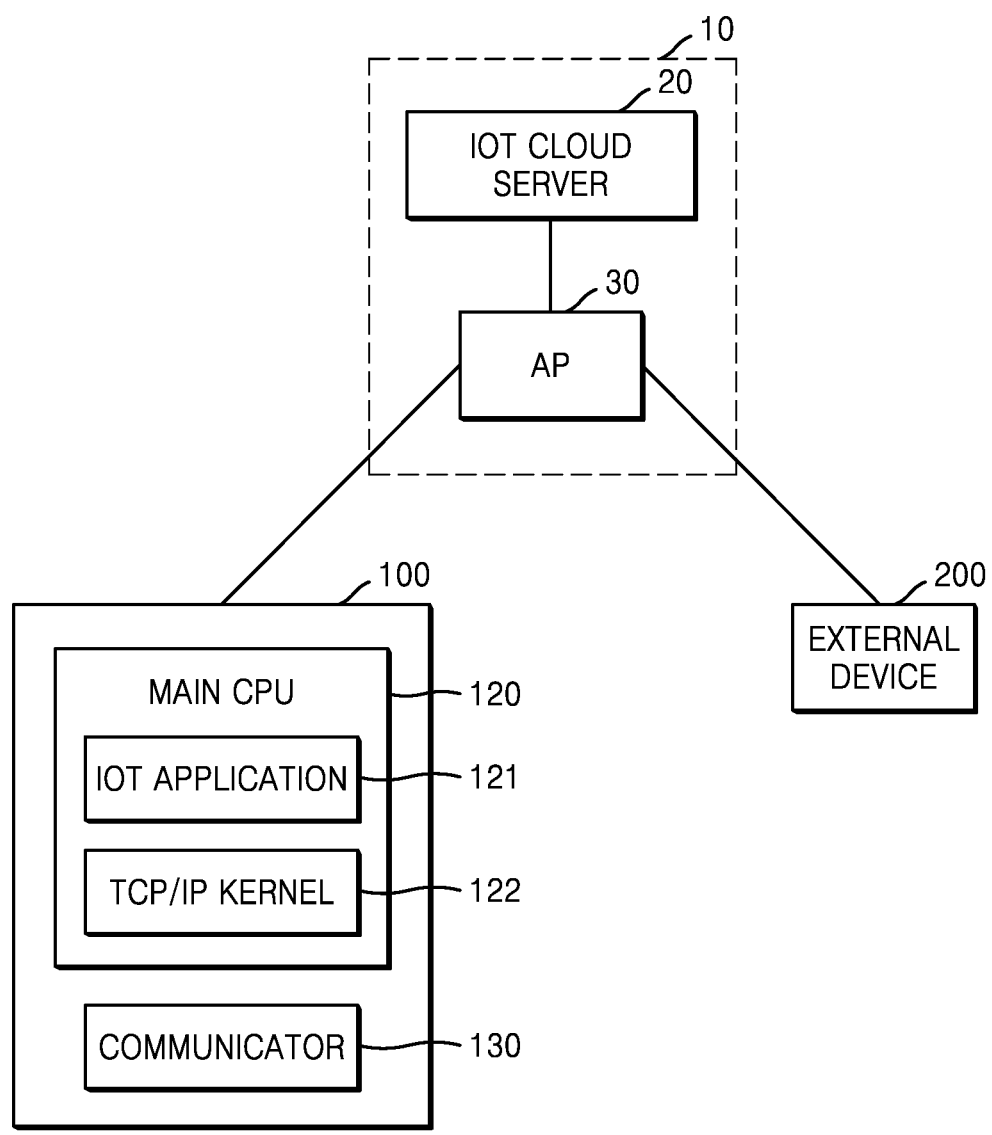
FIG. 2 is a diagram illustrating an example electronic device and an example external device, which operate in an IoT environment, according to an embodiment of the disclosure.

FIG. 2 is a diagram illustrating an example electronic device 100 and an external device 200, which operate in an IoT environment, according to an embodiment of the disclosure. In FIG. 2, an example in which the electronic device 100 is a display device and the external device 200 is a portable device will be described as an example.

Referring to FIG. 2, the IoT cloud and AP 10 of FIG. 1 may include an IoT cloud server 20 and an AP 30.

The IoT cloud server 20 may include an external device server, which may refer, for example, to a server for supporting an application executable on the external device 200 (referred to as 'portable device 200'). In addition, the IoT cloud server 20 may further include at least one cloud server. In this example, the 'server' may refer, for example, to a computing device that operates to provide or receive data, operations, or services to an electronic device or the like through a network, and may be implemented in software and/or hardware. In the disclosed embodiment of the disclosure, a case in which the server is a cloud server formed of a cloud will be described as an example.

The AP 30 may serve as a bridge connecting a wireless LAN to which the electronic device 100 (referred to as 'display device 100') is connected to a mobile communication network connected to the IoT cloud server 20. In addition, in FIG. 2, an example in which the Internet, which is a network using the TCP/IP communication protocol, is used in order to implement an IoT platform will be described as an example.

The display device 100 and the portable device 200 according to an embodiment of the disclosure may be registered in the IoT cloud server 20 and may be connected to each other through the IoT cloud server 20 and the AP 30. For example, a TCP session using a TCP/IP communication protocol between the portable device 200 and the IoT cloud server 20 may be established, and a TCP session using a TCP/IP communication protocol between the display device 100 and the IoT cloud server 20 may be established.

The display device 100 according to an embodiment of the disclosure may include a processor (e.g., including processing circuitry) 120. The processor 120 may include, for example, and without limitation, a main central processing unit (CPU). The processor 120 may include various processing circuitry and control the overall operation of the display device 100. For example, the processor 120 may control the operation of the display device 100 after the display device 100 is woken up.

The processor 120 may include an IoT application 121 and a TCP/IP kernel 122. In this example, the IoT application 121 may include, for example, an application that enables the implementation of an IoT platform, and may control operations performed through the IoT platform. The IoT application 121 may control necessary operations to be performed in order to keep the IoT platform in an active state or to change the state of the IoT platform to an inactive state.

For example, the IoT application 121 may perform device registration for a server or external device connected to the display device 100 through an IoT. For example, the IoT application 121 may perform device registration for an IoT cloud server or a user's mobile device connected to the display device 100 through an IoT.

When the device registration is normally performed, the IoT application 121 may transmit an Internet protocol (IP) address of the IoT cloud server 20 used to implement the IoT platform to the communicator (e.g., including communication circuitry) 130. The IoT application 121 may establish a TCP session between the display device 100 and the IoT cloud server 20 to control the communication connection between the display device 100 and the IoT cloud server 20 to be maintained. In this case, when a TCP session is established, information on the established TCP session may be referred to as 'TCP session information'.

The TCP/IP kernel 122 may control and may be responsible for transmission and reception of data based on the TCP/IP communication protocol that is an Internet protocol.

The TCP/IP kernel 122 communicates with another electronic device or server according to the TCP/IP communication protocol. For example, the TCP/IP kernel 122 may communicate with the IoT cloud server 20 through the AP 30 according to the TCP/IP communication protocol.

Hereinafter, an operation of remotely powering on the display device 100 using the portable device 200 after the display device 100 is powered off and enters a suspend mode in a state in which a TCP session between the display device 100 and the IoT cloud server 20 and a TCP session between the portable device 200 and the IoT cloud server 20 are established will be described as an example.

In this example, power-off may refer, for example, to an operation in which the display device 100 that is reproducing image data is turned off using a remote control device (not shown) or the like. When the display device 100 is powered off, the display screen of the display device 100 may, for example, be switched to a black screen. Power-on may refer, for example, to an operation in which the display device 100 in a black screen state is switched to a state in which image data may be reproduced. A power on/off command may also be referred to as an operation mode change command or a power control command. For example, 'power off' and 'power on' may also be referred to as 'turn off' and 'turn on', respectively. A power-off command may correspond to a command to change the operation mode of the display device 100 from a normal mode to a suspend mode, and a power-on command may correspond to a command to change the operation mode of the display device 100 from a suspend mode to a normal mode.

The operation mode of the display device 100 may include a normal mode and a suspend mode. For example, the normal mode and the standby mode may be distinguished according to whether power is supplied to at least one component other than a communicator 130. For example, the normal mode may refer to an operation state in which power is supplied to the processor 120 and the communicator 130 of the display device 100. In addition, the suspend mode may refer to an operation state in which power is not supplied to the processor 120 of the display device 100 and power is supplied to the communicator 130 of the display device 100. In addition, even when the operation mode of the display device 100 is switched from the normal mode to the suspend mode, power supplied to a memory (not shown) of the display device 100 may be maintained and data stored in the memory may be maintained.

The processor 120 according to an embodiment of the disclosure may obtain the IP address of the IoT cloud server 20 when a TCP session between the display device 100 and the IoT cloud server 20 is established. The processor 120 may transmit the obtained IP address of the IoT cloud server 20 to the communicator 130.

A communication module in the communicator 130 may include a communication module corresponding to a wired or wireless network that is responsible for the connection of a Mac layer (layer 2) or lower. For example, the communication module in the communicator 130 may include a Wi-Fi chipset (not shown), which is a WiFi module (wireless), and/or an Ethernet module (wired). The communication module in the communicator 130 may operate independently of the processor 120 such as a main CPU.

The communicator 130 according to an embodiment of the disclosure may be connected to the processor 120 through a USB interface. In this case, the processor 120 serves as a USB host and the communicator 130 serves as a USB device.

When the display device 100 receives a power-off input from a remote control device or the like, the processor 120 may enter a suspend mode.

When the display device 100 enters the suspend mode, a display or the like may be turned off, and a power supply may be maintained in a component such as the communicator 130 and thus the operation mode of the display device 100 may be switched to a low power mode.

In order for the display device 100 to normally receive a signal transmitted from the portable device 200, the display device 100 and the portable device 200 have to maintain a communication connection. For example, even after the display device 100 is powered off and enters the suspend mode, the display device 100 has to maintain a communication connection with the portable device 200.

For example, in order for the display device 100 implementing the IoT platform to be woken up by the portable device 200, the display device 100 has to be able to normally receive a power-on packet requesting power-on from the IoT cloud server 20. In order for the display device 100 in the suspend mode to normally receive the power-on packet from the IoT cloud server 20, a TCP session for communication according to a TCP/IP protocol has to be always maintained between the display device 100 and the IoT cloud server 20.

The processor 120 may offload a minimum number of operations from among the operations performed by the processor 120 to the communicator 130 to maintain the TCP session even in the suspend mode.

In the suspend mode, when the processor 120 resumes operation as the communicator 130 may receive the power-on packet, the communicator 130 serving as a USB device is reset. Accordingly, the communicator 130 may perform a link down/up operation. The link down/up operation refers to an operation of physically releasing the connection with the AP 30 and then connecting to the AP 30 again. The link down/up operation may be referred to as a link down/up event, a connection release operation, a connection release event, or a disconnection and reconnection, but is not limited thereto.

Figure 3:
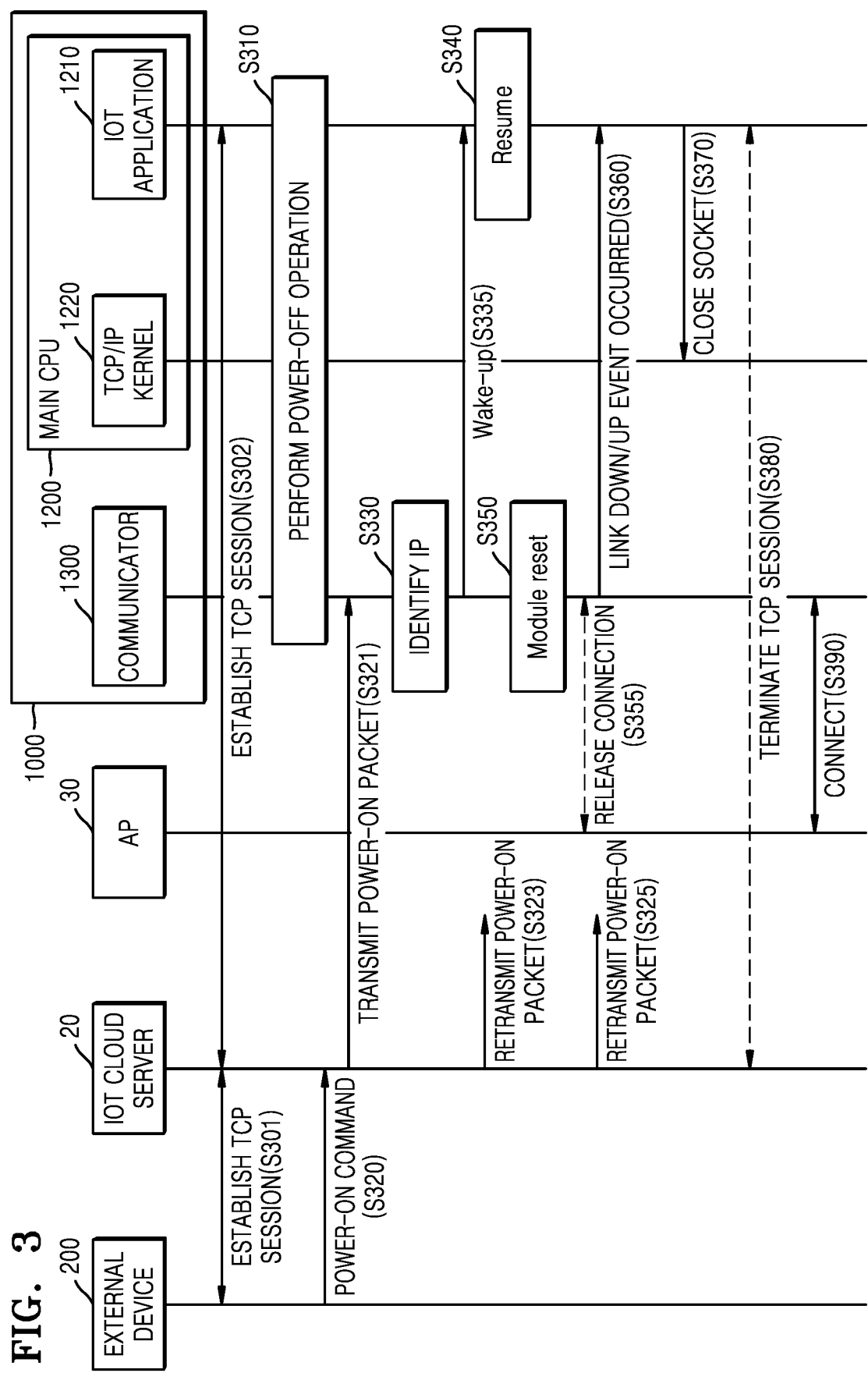
FIG. 3 is a signal flow diagram illustrating an example operation when an electronic device receives a power-on packet from an IoT cloud server in a suspend mode in an IoT environment, according to an embodiment of the disclosure.

FIG. 3 is a signal flow diagram illustrating an example operation when an electronic device receives a power-on packet from an IoT cloud server in a suspend mode in an IoT environment according to an embodiment.

Referring to FIG. 3, an electronic device 1000 may perform device registration for an IoT cloud server 20 or an external device 200 connected to the electronic device 1000 through an IoT.

When the device registration is normally performed, the electronic device 1000 may establish a TCP session with the IoT cloud server 20, the TCP session being used to implement an IoT platform (operation S302). A TCP session may be established between the external device 200 and the IoT cloud server 20 (operation S301).

When a TCP session between the electronic device 1000 and the IoT cloud server 20 is established, a processor 1200 of the electronic device 1000 may obtain an IP address of the IoT cloud server 20. The processor 1200 may transmit the obtained IP address of the IoT cloud server 20 to a communicator 1300.

A communication module in the communicator 1300 may include a communication module corresponding to a wired or wireless network that is responsible for the connection of a Mac layer (layer 2) or lower. For example, the communication module in the communicator 1300 may include a Wi-Fi chipset (not shown), which is a WiFi module (wireless), and/or an Ethernet module (wired). The communication module in the communicator 1300 may operate independently of the processor 1200 such as a main CPU.

When the electronic device 1000 receives a power-off input from a remote control device or the like, the electronic device 1000 may perform a power-off operation (operation S310).

For example, when a power-off input is received, the processor 1200 may enter a suspend mode. The processor 1200 may offload a minimum and/or reduced number of operations from among the operations performed by the processor 1200 to the communicator 1300 to maintain the TCP session even in the suspend mode.

The external device 200 may transmit a power-on command to the IoT cloud server 20 to power on the electronic device 1000 (operation S320). The IoT cloud server 20 may receive the power-on command from the external device 200, and may generate a power-on packet in response to the power-on command and transmit the power-on packet to the electronic device 1000 (operation S321).

The communicator 1300 of the electronic device 1000 may receive the power-on packet, parse source IP field information (e.g., a source IP address) existing in the received power-on packet, and identify whether the parsed source IP address matches an IP address of a registered server (e.g., the IoT cloud server 20) (operation S330).

When the parsed source IP address does not match the IP address of the registered server, the communicator 1300 may discard the received power-on packet.

On the other hand, when the parsed source IP address matches the IP address of the registered server, the communicator 1300 may operate to wake up the processor 1200 (operation S335). For example, the communicator 1300 may generate a wake-up pulse for waking up the processor 1200 and control the electronic device 1000 to enter a low power mode. The processor 1200 may perform a resumption operation in the low power mode (operation S340). For example, when the electronic device 1000 enters the low power mode, power is supplied to the processor 1200. When power is supplied to the processor 1200, an IoT application 1210 is activated. In addition, according to the resumption of the processor 1200, a reset of the communicator 1300 occurs (operation S350).

In general, the processor 1200 and the communicator 1300 each include independent chipsets. For example, the processor 1200 and the communicator 1300 may be connected to each other through a USB interface. In this case, the processor 1200 serves as a USB host and the communicator 1300 serves as a USB device. When the processor 1200 is resumed by the reception of the power-on packet, the reset of the communicator 1300 occurs, and the communicator 1300 performs a link down/up operation. The link down/up operation may refer, for example, to an operation of physically releasing the connection with an AP 30 (operation S355) and then connecting to the AP 30 again (operation S390).

Accordingly, the processor 1200 receives a link down/up event (operation S360), and the processor 1200 determines that the connection with the AP 30 is released due to a communication network problem in the communicator 1300 and then is resumed again. Accordingly, the processor 1200 closes a TCP socket to re-establish the TCP session (operation S370), and as the TCP socket is closed, a previously established TCP session is terminated (operation S380).

The IoT cloud server 20 retransmits the power-on packet until a response message is received (operations S323 and S325), and when the previously established TCP session is terminated, the IoT cloud server 20 does not retransmit the power-on packet. Accordingly, the processor 1200 may not receive the power-on packet, and thus may not perform a normal power-on operation. To address this problem, the electronic device 100 according to an embodiment of the disclosure may perform a power-on operation by normally receiving a power-on packet even in a power-off state. Hereinafter, an operation of the electronic device 100 according to an example embodiment of the disclosure will be described in greater detail below with reference to FIG. 4.

Figure 4:
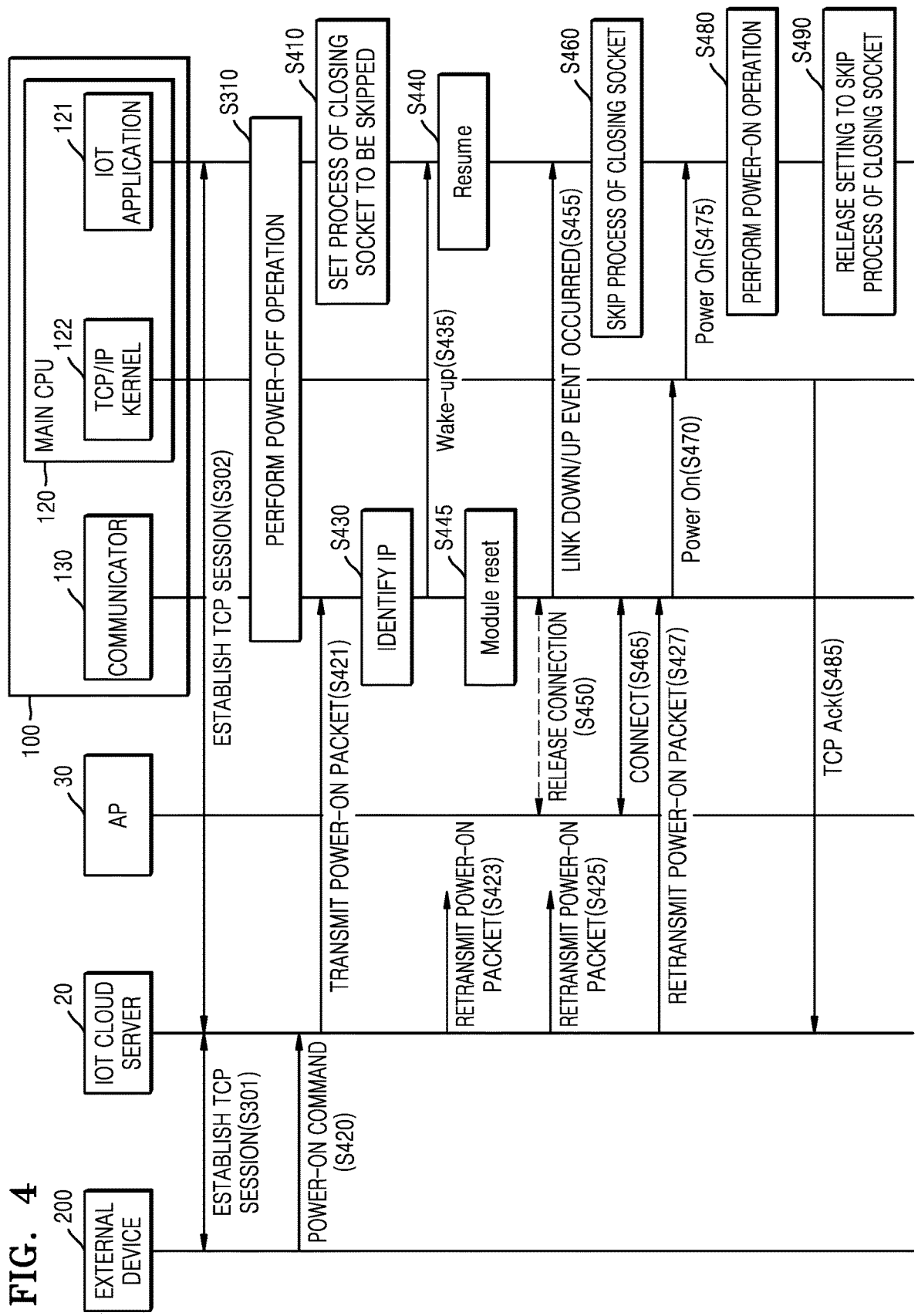
FIG. 4 is a signal flow diagram illustrating an example operation of powering on an electronic device using an external device after the electronic device enters a suspend mode in an IoT environment, according to an embodiment of the disclosure.

FIG. 4 is a diagram illustrating an example operation of powering on an electronic device using an external device after the electronic device enters a suspend mode in an IoT environment, according to an embodiment of the disclosure.

Referring to FIG. 4, an electronic device 100 according to an embodiment of the disclosure may perform device registration for an IoT cloud server 20 or an external device 200 connected to the electronic device 100 through an IoT.

When the device registration is normally performed, the electronic device 100 may establish a TCP session with the IoT cloud server 20, the TCP session being used to implement an IoT platform (operation S302). A TCP session may be established between the external device 200 and the IoT cloud server 20 (operation S301).

When the electronic device 100 receives a power-off command from a remote control device or the like, the electronic device 100 may perform a power-off operation (operation S310).

Because operations S301 to S310 of FIG. 4 correspond to operations S301 to S310 of FIG. 3, detailed descriptions thereof may not be repeated here.

When a processor 120 enters a suspend mode according to the power-off command, an IoT application 121 may set an operation according to a link down/up event to be skipped (operation S410). The processor 120 may set information, associated with an operation, which is performed in response to an operation state change of the communicator 130 occurring, with a first value. When the communicator 130 is reset, the operation state change of the communicator 130 may occur. The operation state change of the communicator 130 includes at least one of occurrence of the link down event of the communicator 130 or occurrence of the link up event of the communicator 130. The first value may represent the operation, which is performed in response to an operation state change of the communicator 130 occurring, to be skipped while the electronic device 100 operates in the suspend mode. For example, the IoT application 121 may transmit a signal, to a TCP/IP kernel 122, for setting a process of closing a TCP socket to be skipped.

The external device 200 may transmit a power-on command to the IoT cloud server 20 to power on the electronic device 100 (operation S420). The IoT cloud server 20 may receive the power-on command from the external device 200, and may generate a power-on packet in response to the power-on command and transmit the power-on packet to the electronic device 100 (operation S421).

A communicator 130 of the electronic device 100 may receive the power-on packet, parse source IP field information (e.g., a source IP address) existing in the received power-on packet, and identify whether the parsed source IP address matches an IP address of a registered server (e.g., the IoT cloud server 20) (operation S430).

When the parsed source IP address does not match the IP address of the registered server, the communicator 130 may discard the received power-on packet.

On the other hand, when the parsed source IP address matches the IP address of the registered server, the communicator 130 may operate to wake up the processor 120 (operation S435). For example, the communicator 130 may generate a wake-up pulse for waking up the processor 120 and control the processor 120 to enter a low power mode. The processor 120 may perform a resumption operation in the low power mode (operation S440). For example, when the processor 120 enters the low power mode, power is supplied to the processor 1200. When power is supplied to the processor 120, an IoT application 121 is activated. In addition, according to the resumption of the processor 120, a reset of the communicator 130 occurs (operation S445).

When the reset of the communicator 130 occurs, the communicator 130 performs a link down/up operation. The link down/up operation refers to an operation of physically releasing the connection with an AP 30 (operation S450) and then connecting to the AP 30 again (operation S465).

Accordingly, the processor 120 receives a link down/up event (S455).

However, because the processor 120 set the operation according to the link down/up event to be skipped in operation S410, the processor 120 does not perform a process of closing a TCP socket even when the link down/up event is received (operation S460). For example, the operation, which is performed in response to an operation state change of the communicator 130 occurring, may be skipped, based on the information with the first value. That is, the operation is not performed, based on the information with the first value.

Accordingly, a previously established TCP session may be continuously maintained.

As the previously established TCP session is maintained, the IoT cloud server 20 may retransmit a power-on packet (operations S423, S425, and S427), and the communicator 130 that has completed a link down/up operation may receive the power-on packet retransmitted by the IoT cloud server 20 (operation S427).

The power-on packet received by the communicator 130 may be transmitted to the IoT application 121 through the TCP/IP kernel 122 (operations S470 and S475).

The TCP/IP kernel 122 may transmit a response message (TCP acknowledgement (Ack)) to the IoT cloud server 20 in response to the reception of the power-on packet (operation S485).

The IoT application 121 that has successfully received the power-on packet may perform a power-on operation (operation S480). For example, the IoT application 121 may determine whether the received power-on packet is data normally requesting power-on, and determine whether to turn on a display (not shown) of the electronic device 100. In this case, when the display (not shown) is turned off, the display (not shown) may, for example, maintain a black screen state. In addition, when the display (not shown) is turned on, the display (not shown) may maintain a state of outputting a meaningful screen instead of a black screen, for example, a state of outputting image data.

After performing the power-on operation, the IoT application 121 may release the setting to skip the operation according to the link down/up event (operation S490). In response to the operation mode of the electronic device 100 being switched from the suspend mode to the normal mode, the processor 120 may set the information with a second value. The second value may represent the operation to be performed in response to an operation state change of the communicator 130 occurring. For example, when a link down/up event occurs, the IoT application 121 may transmit a signal, to the TCP/IP kernel 122, for releasing the setting to skip the process of closing the TCP socket such that a process of closing the TCP socket is performed.

Accordingly, in a normal mode, when a link down/up event occurs, the process of closing the TCP socket may be performed, and the TCP session is terminated.

Figure 5:
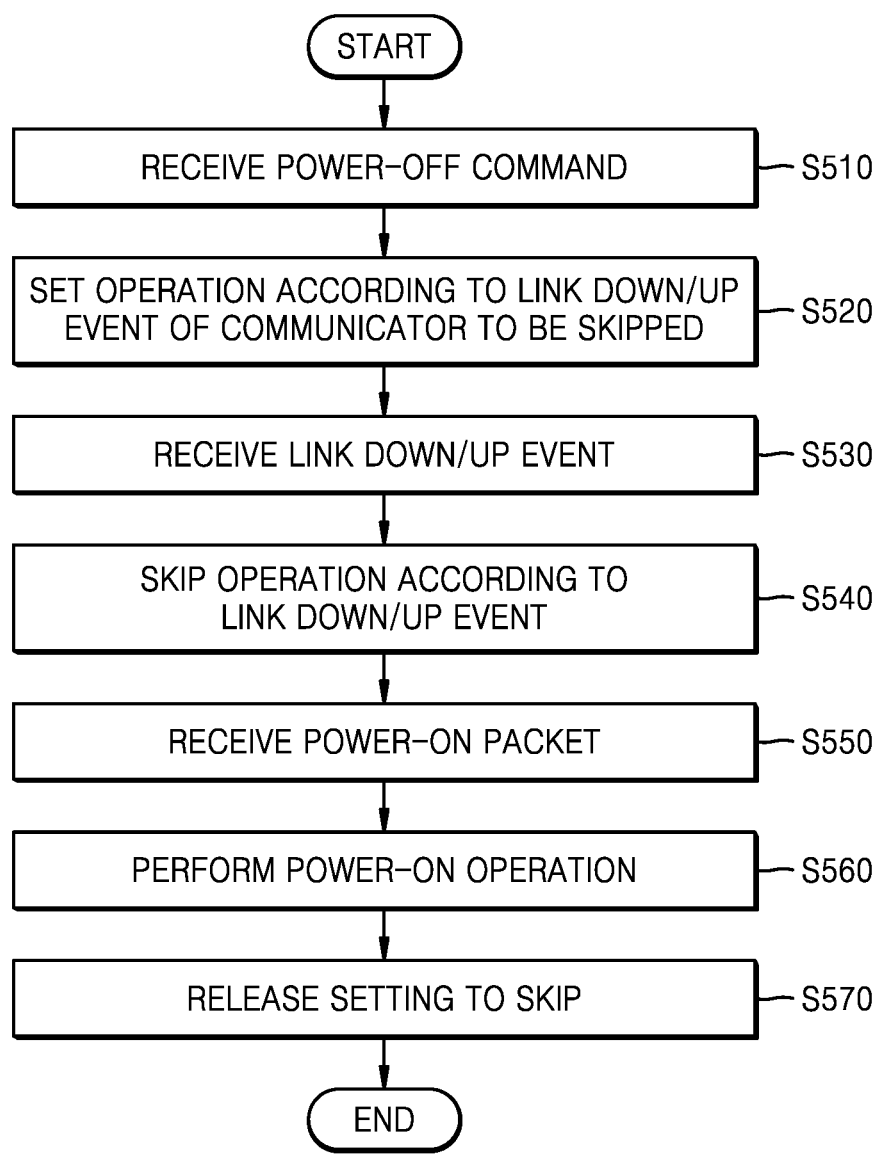
FIG. 5 is a flowchart illustrating an example operating method of an electronic device according to an embodiment of the disclosure.

FIG. 5 is a flowchart illustrating an example operating method of an electronic device according to an embodiment of the disclosure.

Referring to FIG. 5, the electronic device 100 according to an embodiment of the disclosure may receive a power-off command (operation S510). For example, while the electronic device 100 displays an image, the electronic device 100 may receive a user input requesting power-off from a remote control device or the like.

When receiving a power-off command, the electronic device 100 may perform a power-off operation, and may set an operation according to a link down/up event of the communicator 130 to be skipped (operation S520). For example, the electronic device 100 may enter a suspend mode from a normal mode in response to the power-off command. The state of the display of the electronic device 100 that has entered the suspend mode is switched to a black screen state, power is supplied only to the communicator 130, and power supply to the remaining components is blocked. Also, the electronic device 100 may set the process of closing the TCP socket to be skipped.

The electronic device 100 according to an embodiment of the disclosure may receive a link down/up event of the communicator 130 in the suspend mode (operation S530). For example, in the suspend mode, the communicator 130 of the electronic device 100 may receive a power-on packet from the IoT cloud server 20, and may operate to wake up the processor 120 upon receiving the power-on packet. Based on a wake-up signal, when the processor 120 is resumed, a reset of the communicator occurs, and according to the reset of the communicator 130, a link down/up event of the communicator 130 occurs.

Even though a link down/up event is received, the electronic device 100 according to an embodiment of the disclosure may skip an operation according to the link down/up event (operation S540). For example, because an operation according to a link down/up event is set to be skipped in operation S520, a process of closing a TCP socket may be skipped. Accordingly, a communication session (e.g., a TCP session) with the IoT cloud server 20 may be continuously maintained.

As the communication session with the IoT cloud server 20 is maintained, the IoT cloud server 20 may continue to transmit a power-on packet to the electronic device 100 until a response message is received.

When the communicator 130 of the electronic device 100 completes a link down/up operation, the electronic device 100 may receive a retransmitted power-on packet (operation S550) and may perform a normal power-on operation (operation S560).

For example, the electronic device 100 may determine whether the received power-on packet is data normally requesting power-on, and determine whether to turn on a display (not shown) of the electronic device 100. In this case, when the display (not shown) is turned off, the display (not shown) maintains a black screen state. In addition, when the display (not shown) is turned on, the display (not shown) may maintain a state of outputting a meaningful screen instead of a black screen, for example, a state of outputting image data.

After performing the power-on operation, the electronic device 100 may release the setting to skip the operation according to the link down/up event (operation S570). For example, when a link down/up event occurs, the electronic device 100 may release the setting to skip the process of closing the TCP socket such that the process of closing the TCP socket is performed. Accordingly, in a normal mode, when a link down/up event occurs, the electronic device 100 may perform the process of closing the TCP socket and terminate the existing TCP session.

Figure 6:
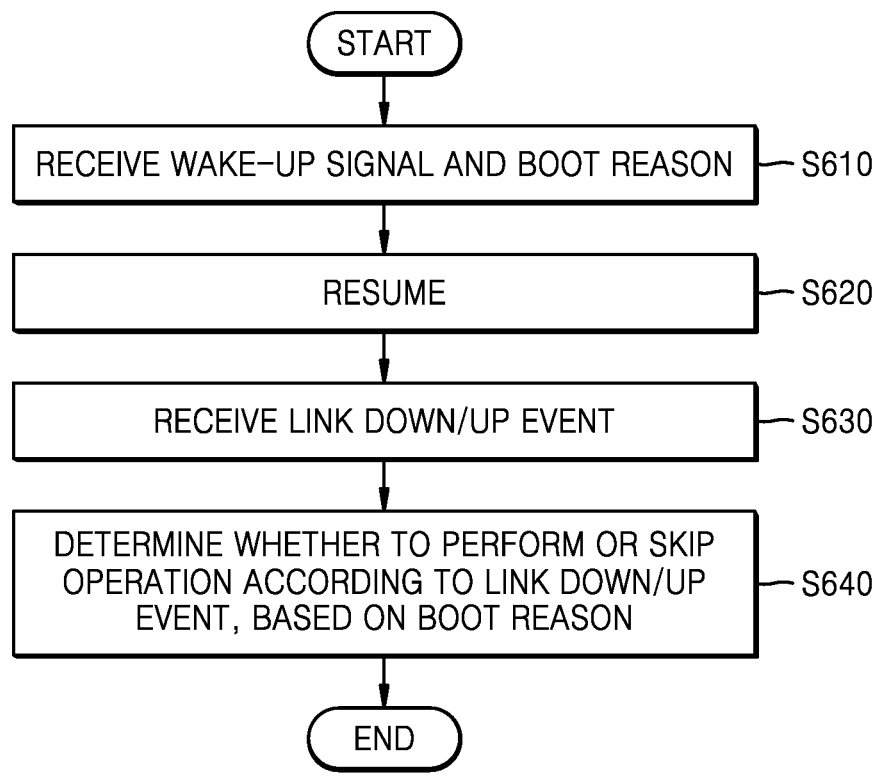
FIG. 6 is a flowchart illustrating an example operating method of an electronic device according to an embodiment of the disclosure.

FIG. 6 is a flowchart illustrating an example operating method of an electronic device according to an embodiment of the disclosure.

Referring to FIG. 6, the electronic device 100 according to an embodiment of the disclosure may receive a power-off command and enter a suspend mode from a normal mode in response to the power-off command. In the suspend mode, power is supplied only to the communicator 130 of the electronic device 100, and power supply to the remaining components is blocked.

The processor 120 of the electronic device 100 according to an embodiment of the disclosure may receive a wake-up signal and a boot reason in the suspend mode (operation S610). For example, the electronic device 100 may include a microcomputer, and the microcomputer may check a wake-up pulse generated by the communicator 130 to wake up the processor 120 and may transmit a set boot reason value to the processor 120 after resuming the processor 120.

In addition, even when the electronic device 100 is in the suspend mode, the microcomputer may maintain an on-state by receiving power. Furthermore, the microcomputer may be included in the communicator 130. In this case, when the electronic device 100 enters the suspend mode, operating power may be supplied to the microcomputer in the communicator 130 when power is supplied to the communicator 130.

In addition, when the electronic device 100 according to the embodiment of the disclosure does not include the microcomputer as a separate component, the communicator 130 may transmit a boot reason to the processor 120.

The processor 120 of the electronic device 100 receives a wake-up signal and is resumed (operation S620).

When the processor 120 is resumed, a reset of the communicator 130 occurs, and according to the reset of the communicator 130, a link down/up event of the communicator 130 occurs.

When the processor 120 of the electronic device 100 according to an embodiment of the disclosure receives a link down/up event (operation S630), the processor 120 may check a boot reason (e.g., the most recent boot reason) received in operation S610 and determine whether to perform or skip an operation according to the link down/up event (operation S640).

For example, when the most recent boot reason is that the communicator 130 of the electronic device 100 receives a power-on packet and accordingly transmits a wake-up signal to the processor 120, the processor 120 may skip an operation according to a link down/up event.

On the other hand, when the most recent boot reason is that a power-on command is received via an infrared (IR) signal or a Bluetooth (BT) signal, the processor 120 may perform an operation according to a link down/up event. However, the disclosure is not limited thereto.

Figure 7:
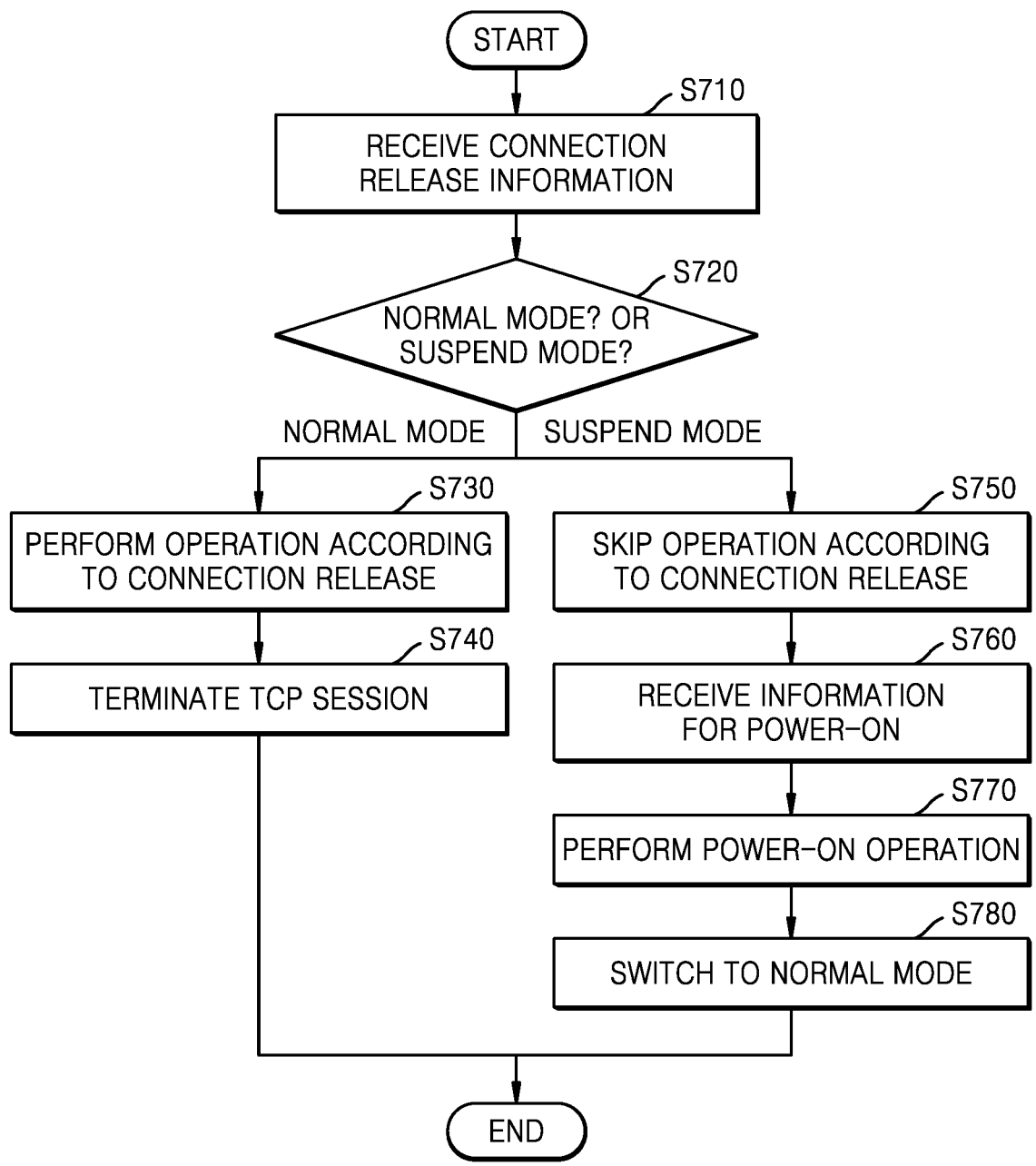
FIG. 7 is a flowchart illustrating an example operating method of an electronic device according to an embodiment of the disclosure.

FIG. 7 is a flowchart illustrating an example operating method of an electronic device according to an embodiment of the disclosure.

Referring to FIG. 7, the processor 120 of the electronic device 100 according to an embodiment of the disclosure may receive connection release information of the communicator 130 (operation S710). For example, when a reset of the communicator 130 occurs, a connection release operation of the communicator 130 occurs according to the reset of the communicator, and the connection release information of the communicator 130 may be transmitted to the processor 120.

The connection release operation of the communicator 130 may include a link down/up operation of the communicator 130, a link down/up event of the communicator 130, a connection release event of the communicator 130, a disconnection and reconnection of the communicator 130, or the like, but is not limited thereto.

When the connection release information of the communicator 130 is received, the processor 120 of the electronic device 100 may determine whether the current operating state of the electronic device 100 is in a normal mode or in a suspend mode (operation S720). When the current operating state of the electronic device 100 is in the normal mode, the processor 120 may perform an operation according to connection release of the communicator 130 (operation S730). The processor 120 closes a TCP socket to re-establish a TCP session. As the TCP socket is closed, a previously established TCP session is terminated (operation S740).

On the other hand, when the current operating state is in the suspend mode, the processor 120 may skip the operation according to the connection release of the communicator 130 (operation S750). The processor 120 may skip a process of closing the TCP socket even though the connection release information of the communicator 130 is received. Accordingly, a TCP session with a server may be maintained, and as the TCP session is maintained, information for power-on may be received (operation S760). For example, a power-on packet received in the communicator 130 may be transmitted to the processor 120.

The processor 120 may perform a power-on operation based on the received information for power-on (operation S770). For example, the processor 120 may determine whether the received power-on packet is data normally requesting power-on, and determine whether to switch the electronic device 100 to a normal mode. When the electronic device 100 is switched to the normal mode (operation S780), a display (not shown) of the electronic device 100 may be turned on. When the display (not shown) is turned on, the display (not shown) may, for example maintain a state of outputting a meaningful screen instead of a black screen, for example, a state of outputting image data.

Figure 8:
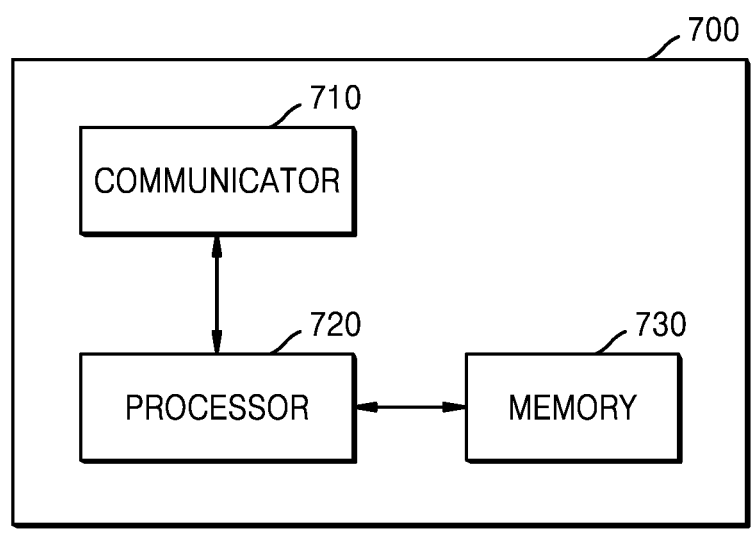
FIG. 8 is a block diagram illustrating an example configuration of an electronic device according to an embodiment of the disclosure.

FIG. 8 is a block diagram illustrating an example configuration of an electronic device 700 according to an embodiment of the disclosure.

The electronic device 700 of FIG. 8 may be an example of the disclosure of the electronic device 100 described above with reference to FIGS. 1, 2, 3, 4, 5, 6 and 7.

Referring to FIG. 8, the electronic device 700 according to an embodiment of the disclosure may include a communicator (e.g., including communication circuitry) 710, a processor (e.g., including processing circuitry) 720, and a memory 730.

The communicator 710 according to an embodiment of the disclosure may include various communication circuitry and transmit and receive data and/or signals to and from an external device or an external server under the control of the processor 720. The communicator 710 according to an embodiment of the disclosure may communicate with an IoT cloud server through at least one wireless network. For example, the communicator 710 may be connected to an AP through at least one wireless network and communicate with the IoT cloud server.

The communicator 710 may transmit and receive data or signals using, for example, and without limitation, at least one of a wireless LAN (e.g., Wi-Fi), a Bluetooth, a wired Ethernet, an IR, a Bluetooth low energy (BLE), an ultrasound, a zigbee, a high-definition multimedia interface (HDMI), or the like. In this case, the communicator 710 may include at least one communication module including various communication circuitry capable of transmitting and receiving data according to a communication standard corresponding, for example, and without limitation, to the wireless LAN (e.g., Wi-Fi), the Bluetooth, the wired Ethernet, the IR), the BLE, the ultrasound, the zigbee, the HDMI, or the like.

A wireless LAN communication module may include a Wi-Fi communication module or the like that performs wireless communication according to a Wi-Fi communication standard. The Wi-Fi communication module may include a Wi-Fi chipset, which is a Wi-Fi module capable of transmitting packet-type data according to the Wi-Fi communication standard.

For example, a communication module in the communicator 710 may include a communication module corresponding to a wired or wireless network that is responsible for the connection of a MAC layer (layer 2) or lower. For example, the communication module in the communicator 710 may include a Wi-Fi chipset (not shown), which is a WiFi module (wireless), and/or an Ethernet module (wired). The communication module in the communicator 710 may operate independently of the processor 720 such as a main CPU.

Further, the communicator 710 may include a near field communication module (e.g., an IR communication module) capable of receiving a control command from a remote control device. In this case, the communicator 710 may receive a control command from the remote control device. Alternatively, the communicator 710 may receive a control command based on an IoT platform through a wireless LAN communication module. In this case, the control command may be a control command requesting power-off of the electronic device 700. The processor 720 may control the electronic device 700 to enter a suspend mode from a normal mode in response to the received control command. For example, the state of the display of the electronic device 700 that has entered the suspend mode may, for example, be switched to a black screen state, power is supplied only to the communicator 710, and power supply to the remaining components is blocked.

The processor 720 according to an embodiment of the disclosure may include various processing circuitry and control the overall operation of the electronic device 700. Also, the processor 720 may control other components in the electronic device 700 to perform a certain operation.

The processor 720 according to an embodiment of the disclosure may execute one or more programs stored in the memory 730. The processor 720 may include a single core, a dual core, a triple core, a quad core, or multiple cores. Also, the processor 720 may include a plurality of processors.

The memory 730 according to an embodiment of the disclosure may store data, programs, or applications for driving and controlling the electronic device 700.

Each of the programs stored in the memory 730 may include one or more instructions. The program (one or more instructions) or application stored in the memory 730 may be executed by the processor 720.

The processor 720 according to an embodiment of the disclosure may set an operation according to a link down/up event of the communicator 710 to be skipped when a control command (e.g., a power-off command) requesting power-off is received. For example, the processor 720 may set a process of closing a TCP socket to be skipped.

When the communicator 710 receives a power-on packet, the communicator 710 may generate a wake-up pulse for waking up to the processor 720 and control the processor 720 to enter a low power mode.

The processor 720 may perform a resumption operation in the low power mode. For example, when the processor 720 enters the low power mode, power is supplied to the processor 720. When power is supplied to the processor 720, an IoT application is activated. In addition, a reset of the communicator 710 occurs according to the resumption of the processor 720.

When the reset of the communicator 710 occurs, the communicator 710 may perform a link down/up operation. The link down/up operation may refer, for example, to an operation of physically releasing the connection with the AP and then connecting to the AP again. Accordingly, the processor 720 receives a link down/up event. However, because the processor 720 set an operation according to a link down/up event to be skipped, the processor 720 does not perform a process of closing a TCP socket even when the link down/up event is received. Accordingly, a previously established TCP session may be continuously maintained.

As the previously established TCP session is maintained, the processor 720 may receive a retransmitted power-on packet and perform a normal power-on operation. In addition, after performing the power-on operation, the processor 720 may release the setting to skip the operation according to the link down/up event of the communicator 710. For example, when a link down/up event of the communicator 710 occurs in a normal mode, the processor 720 may release the setting to skip the process of closing the TCP socket such that the process of closing the TCP socket is performed.

The processor 720 according to an embodiment of the disclosure may receive a wake-up signal and a boot reason. The processor 720 may be resumed based on the wake-up signal, and a reset of the communicator 710 occurs according to the resumption of the processor 720. When the reset of the communicator 710 occurs, the communicator 710 performs a link down/up operation. When the processor 720 receives a link down/up event, the processor 720 may check a received boot reason (e.g., the most recent boot reason) and determine whether to perform or skip an operation according to the link down/up event.

For example, when the most recent boot reason is that the communicator 710 receives a power-on packet and accordingly transmits a wake-up signal to the processor 720, the processor 720 may skip an operation according to a link down/up event. On the other hand, when the most recent boot reason is that a power-on command is received via an IR signal or a BT signal, the processor 720 may perform an operation according to a link down/up event. However, the disclosure is not limited thereto.

Figure 9:
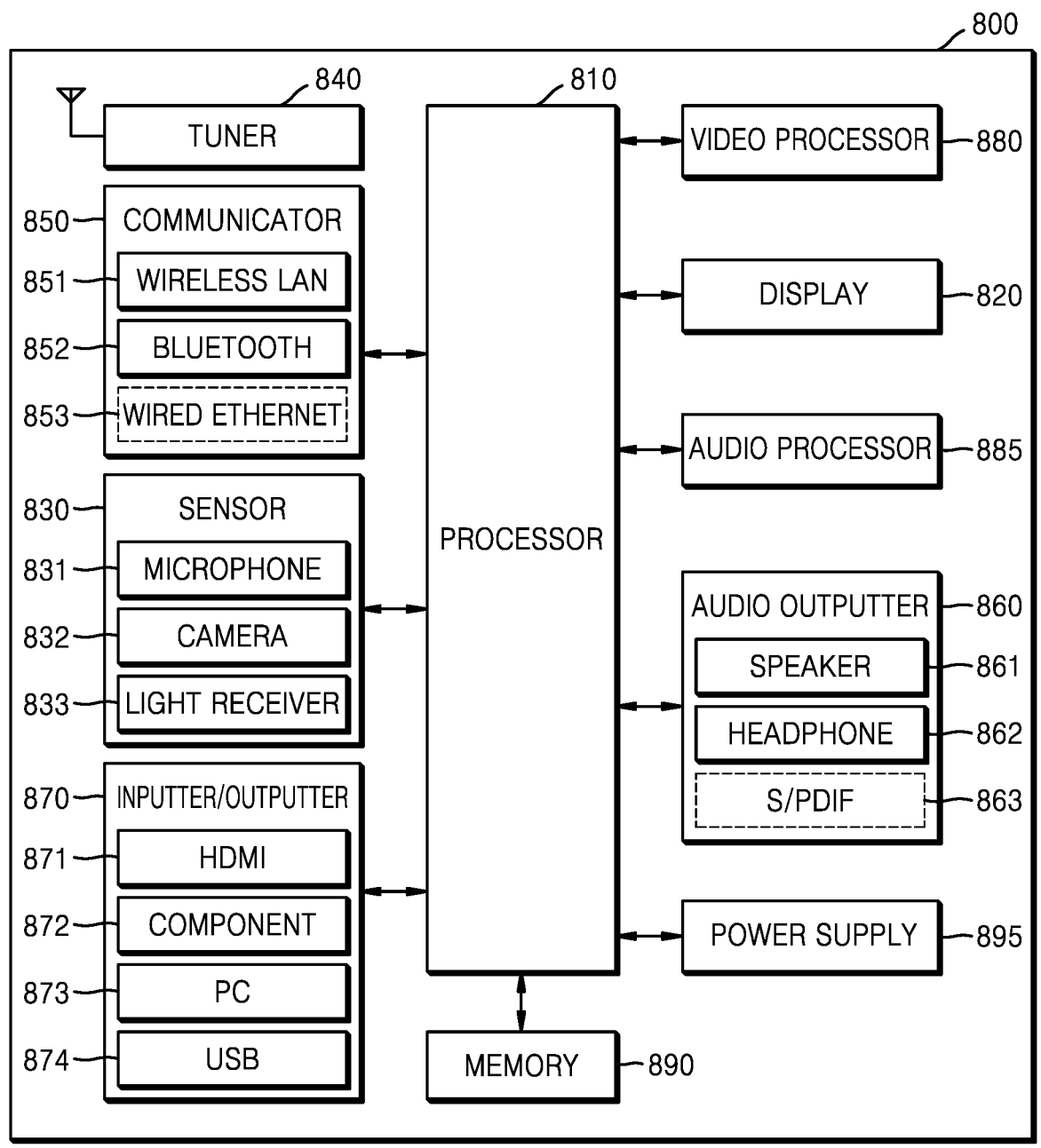
FIG. 9 is a block diagram illustrating an example configuration of an electronic device according to another embodiment of the disclosure.

FIG. 9 is a block diagram illustrating an example configuration of an electronic device 800 according to another example embodiment of the disclosure.

The electronic device 800 of FIG. 9 may be an example of the disclosure of the electronic device 100 or 700 described with reference to FIGS. 1, 2, 3, 4, 5, 6, 7 and 8.

Referring to FIG. 9, the electronic device 800 according to an embodiment of the disclosure may include a tuner 840, a processor (e.g., including processing circuitry) 810, a display 820, a communicator (e.g., including communication circuitry) 850, a sensor 830, an inputter/outputter (e.g., including input/output circuitry) 870, a video processor (e.g., including video processing circuitry) 880, an audio processor (e.g., including audio processing circuitry) 885, an audio outputter (e.g., including audio output circuitry) 860, a memory 890, and a power supply 895.

The communicator 850 of FIG. 9 corresponds to the communicator 710 of FIG. 8, the processor 810 of FIG. 9 corresponds to the processor 720 of FIG. 8, and the memory 890 of FIG. 9 corresponds to the memory 730 of FIG. 8, and thus, descriptions thereof may not be repeated here.

The tuner 840 according to an embodiment of the disclosure may tune and select a frequency of a channel which the electronic device 800 wants to receive from among many radio wave components that are obtained via amplification, mixing, resonance, or the like of a wired or wireless broadcasting signal. The broadcasting signal may include, for example, audio, video, and additional information (e.g., an electronic program guide (EPG)).

The tuner 840 may receive a broadcasting signal from various sources, such as terrestrial broadcasting, cable broadcasting, satellite broadcasting, and Internet broadcasting. The tuner 840 may also receive a broadcasting signal from a source such as analog broadcasting or digital broadcasting.

The communicator 850 according to an embodiment of the disclosure may include various communication circuitry and transmit and receive data and/or a signal to and from an external device or server under the control of the processor 810. The processor 810 may transmit and receive content to and from the external device connected through the communicator 850, download an application from the external device, or perform web browsing through the communicator 850.

In addition, the communicator 850 may include a module combination including one or more of a wireless LAN 851, a Bluetooth 852, and a wired Ethernet 853.

The video processor 880 may include various video processing circuitry and processes video data received by the electronic device 800. The video processor 880 may perform a variety of image processing, such as decoding, scaling, noise filtering, frame rate transformation, and resolution transformation, on video data.

The sensor 830 may sense a voice of a user, an image of the user, or an interaction with the user, and may include, for example, a microphone 831, a camera 832, and a light receiver 833.

The microphone 831 receives an uttered voice of the user. The microphone 831 may transform the received voice into an electrical signal and output the electrical signal to the processor 810. A user voice may include, for example, a voice corresponding to a menu or function of the electronic device 800.

A camera 832 receives an image (for example, consecutive frames) corresponding to a motion of the user including a gesture within a recognition range of the camera 832. The processor 810 may select a menu that is displayed on the electronic device 800 using a result of the recognition of the received motion, or perform control corresponding to the result of the motion recognition.

The light receiver 833 receives an optical signal (including a control signal) from an external control apparatus (not shown) via a light window (not shown) of a bezel of the display 820. The light receiver 833 may receive an optical signal corresponding to a user input (e.g., example, touch, pressing, a touch gesture, a voice, or a motion) from the external control apparatus (not shown). A control signal may be extracted from the received optical signal under the control of the processor 810.

The inputter/outputter 870 may include various input/output circuitry and may receive video (e.g., a moving picture), audio (e.g., a voice or music), and additional information (e.g., an EPG) from outside the electronic device 800 under the control of the processor 810. The inputter/outputter 870 may include, for example, a high-definition multimedia interface (HDMI) port 871, a component jack 872, a PC port 873, a USB port 874, etc. The inputter/outputter 870 may include a combination of the HDMI port 871, the component jack 872, the PC port 873, and the USB port 874.

The processor 810 may include various processing circuitry and controls an overall operation of the electronic device 800 and signal transfer among the internal components of the electronic device 800 and processes data. When there is an input of a user or stored preset conditions are satisfied, the processor 810 may execute an operation system (OS) and various applications that are stored in the memory 890.

The processor 810 may include random-access memory (RAM) that stores a signal or data input by an external source of the electronic device 800 or is used as a memory area for various operations performed by the electronic device 800, read-only memory (ROM) that stores a control program for controlling the electronic device 800, and a processor.

The processor 810 may include a graphics processor (not shown). The graphics processor (not shown) generates a screen image including various objects, such as an icon, an image, and a text, using an operator (not shown) and a renderer (not shown). The operator calculates attribute values, such as a coordinate value, a shape, a size, a color, and the like, with which each object is to be displayed according to layouts of the screen image, based on the user interaction sensed by the sensor 830. The renderer generates screen images of various layouts including objects, based on the attribute values calculated by the operator. The screen images generated by the rendering unit are displayed on a display area of the display 820.

The display 820 may generate a driving signal by converting an image signal, a data signal, an on-screen display (OSD) signal, and a control signal that are processed by the processor 810. The display 1200 may, for example, and without limitation, be a plasma display panel (PDP), a liquid-crystal display (LCD), an organic light-emitting device (OLED), a flexible display, a 3D display, or the like. In addition, the display 820 may be configured as a touch screen, and thus may serve as an input device as well as an output device.

The audio processor 885 may include various processing circuitry and processes audio data. The audio processor 885 may perform a variety of processing, such as decoding, amplification, or noise filtering, on the audio data. The audio processor 885 may include a plurality of audio processing modules to process audios corresponding to a plurality of pieces of content.

The audio outputter 860 may include various audio output circuitry and outputs audio included in a broadcasting signal received via the tuner 840, under the control of the processor 810. The audio outputter 860 may also output audio (e.g., a voice or a sound) that is input via the communicator 850 or the inputter/outputter 870. The audio outputter 860 may also output audio stored in the memory 890 under the control of the processor 810. The audio outputter 860 may include, for example, and without limitation, at least one selected from a speaker 861, a headphone output port 862, a Sony/Philips Digital Interface (S/PDIF) output port 863, or the like. The audio outputter 1250 may include a combination of the speaker 861, the headphone output port 862, and the S/PDIF output port 863.

The power supply 895 supplies power that is input from an external power source, to the internal components of the electronic device 800, under the control of the processor 810. The power supply 895 may also supply power that is output by one or more batteries located in the electronic device 800, to the internal components of the electronic device 800, under the control of the processor 810.

The memory 890 may store various data, programs, or applications for driving and controlling the electronic device 800 under the control of the processor 810. The memory 890 may include a broadcasting receiving module, a channel control module, a volume control module, a communication control module, a voice recognition module, a motion recognition module, a light receiving module, a display control module, an audio control module, an external input control module, a power control module, a power control module of a wirelessly (e.g., Bluetooth) connected external apparatus, a voice database (DB), or a motion DB, which are not shown. These modules and the DBs of the memory 890, which are not shown, may be implemented as software in order to perform a broadcasting reception control function, a channel control function, a volume control function, a communication control function, a voice recognition function, a motion recognition function, a light receiving control function, a display control function, an audio control function, an external input control function, a power control function, or a power control function of the wirelessly (e.g., Bluetooth) connected external apparatus in the electronic device 800. The processor 810 may perform these functions using the software stored in the memory 890.

The block diagrams of the electronic devices 700 and 800, which are illustrated in FIGS. 8 and 9, are only illustrative. Each component in the block diagrams may be integrated, added, or omitted according to actually implemented specifications of the display devices 700 and 800. That is, as needed, two or more components may be integrated into one component, or one component may be separated into two or more components. In addition, the functions performed in each block are to describe embodiments of the disclosure, and detailed operations or devices thereof do not limit the right scope of the disclosure.

The operating method of an electronic device, according to an embodiment of the disclosure, may be implemented as computer commands which may be executed by various computer, and recorded on a non-transitory computer-readable recording medium. The non-transitory computer-readable recording medium may include program commands, data files, and data structures, taken alone or in combination. The program commands recorded on the non-transitory computer-readable recording medium may be specially designed and constructed for the disclosure or may be known to and usable by those of ordinary skill in a field of computer software. Examples of the non-transitory computer-readable medium include magnetic media such as hard discs, floppy discs, or magnetic tapes, optical media such as compact disc-read only memories (CD-ROMs), or digital versatile discs (DVDs), magneto-optical media such as floptical discs, and hardware devices that are specially configured to store and carry out program commands, such as ROMs, RAMs, or flash memories. Examples of the program commands include a high-level language code that may include one or more instructions executed by a computer using an interpreter as well as a machine language code made by a compiler. The one or more instructions may include a code made by a compiler or a code executable by an interpreter.

In addition, the electronic device or the operating method of the electronic device, according to embodiments of the disclosure, may be provided by being included in a computer program product. The computer program product may be traded between a seller and a purchaser.

The computer program product may include a software (S/W) program, a non-transitory computer-readable storage medium in which the S/W program is stored. For example, the computer program product may include a S/W program form of product (e.g., a downloadable application) electronically distributed through a manufacturer of the electronic device or an electronic market (e.g., Google PlayStore™, or App Store™). For the electronic distribution, at least a portion of the S/W program may be stored in a storage medium or temporarily generated. In this case, the storage medium may be included in a server of the manufacturer, a server of the electronic market, or a relay server configured to temporarily store the S/W program.

The computer program product may include a storage medium of a server or a storage medium of a client device in a system including the server and the client device. Alternatively, when a third device (e.g., a smartphone) connected to the server or the client device through communication exists, the computer program product may include a storage medium of the third device. Alternatively, the computer program product may include the S/W program to be transmitted from the server to the client device or the third device or transmitted from the third device to the client device.

In this case, one of the server, the client device, and the third device may execute the computer program product and perform the methods according to the embodiments of the disclosure. Alternatively, two or more of the server, the client device, and the third device may execute the computer program product and perform the methods according to the embodiments of the disclosure in a distributed fashion.

For example, the server (e.g., a cloud server, an artificial intelligence server, or the like) may execute the computer program product stored therein to control the client device connected to the server through communication such that the client device performs the methods according to the embodiments of the disclosure.

An electronic device according to an embodiment of the disclosure may maintain a TCP session, in a suspend mode, by skipping an operation according to a network link down/up event according to a reset of a communicator, and accordingly, may receive a power-on packet.

It should be understood that embodiments of the disclosure described herein should be considered in a descriptive sense only and not for purposes of limitation.

What is claimed is:

1. An electronic device comprising:
   a communicator comprising communication circuitry configured to communicate with a server;
   a memory storing one or more instructions; and
   a processor configured to execute the one or more instructions stored in the memory to:
   set information, associated with an operation performed in response to an operation state change of the communicator occurring, with a first value, wherein the first value represents the operation performed in response to the operation state change of the communicator occurring to be skipped based on the electronic device operating in a suspend mode, in response to the operation state change of the communicator occurring based on the electronic device operating in the suspend mode, skip the operation performed in response to the operation state change of the communicator occurring based on the information with the first value, in response to an operation mode of the electronic device being switched from the suspend mode to a normal mode, set the information with a second value, wherein the second value represents the operation performed in response to the operation state change of the communicator occurring to be performed in response to the operation state change of the communicator occurring.

2. The electronic device of claim 1, wherein the processor is further configured to execute the one or more instruction to establish a transmission control protocol (TCP) session with the server using a transmission control protocol/Internet protocol (TCP/IP) in the normal mode, and the communicator is further configured to perform an operation of maintaining the TCP session and to receive a power-on packet from the server through the TCP session in the suspend mode.

3. The electronic device of claim 2, wherein the operation state change of the communicator includes at least one of occurrence of a link down event of the communicator or occurrence of a link up event of the communicator, wherein the processor is further configured to execute the one or more instruction to maintain the TCP session without performing the operation even though the operation state change of the communicator is occurred, based on the information with the first value.

4. The electronic device of claim 3, wherein the processor is further configured to execute the one or more instruction to maintain the TCP session by skipping a process of closing a TCP socket.

5. The electronic device of claim 1, wherein the communicator is further configured to transmit a wake-up signal to the processor based on receiving a power-on packet from the server in the suspend mode, and the processor is further configured to execute the one or more instruction to:

resume based on the wake-up signal and control the communicator to be reset, wherein based on the communicator being reset, at least one of a link down event of the communicator or a link up event of the communicator occurring, and skip the operation based on the information with the first value.

6. The electronic device of claim 5, wherein the communicator is further configured to: in response to the power-on packet retransmitted from the server being received after the reset of the communicator is completed, transmit the power-on packet retransmitted to the processor, and the processor is further configured to execute the one or more instruction to switch to the normal mode by performing a power-on operation based on receiving the power-on packet retransmitted.

7. The electronic device of claim 6, wherein the processor is further configured to execute the one or more instruction to control the communicator to transmit a response message to the server in response to receiving the power-on packet retransmitted signal.

8. The electronic device of claim 6, wherein the processor is further configured to execute the one or more instruction to terminate a TCP session with the server by performing a process of closing a TCP socket based on the operation state change of the communicator occurring in the normal mode occurring.

9. The electronic device of claim 1, wherein the processor is further configured to execute the one or more instruction to, in response to receiving an input for switching the operation mode of the electronic device from the normal mode to the suspend mode being received, set the information with the first value.

10. A method of operating an electronic device comprising a processor and a communicator including communication circuitry, the method comprising:

setting information, associated with an operation performed in response to an operation state change of the communicator occurring, with a first value, wherein the first value represents the operation performed in response to the operation state change of the communicator occurring to be skipped based on the electronic device operating in a suspend mode;

in response to the operation state change of the communicator occurring based on the electronic device operating in the suspend mode, skipping the operation performed in response to the operation state change of the communicator occurring based on the information with the first value; and in response to an operation mode of the electronic device being switched from the suspend mode to a normal mode, setting the information with a second value, wherein the second value represents the operation performed in response to the operation state change of the communicator occurring to be performed in response to the operation state change of the communicator occurring.

11. The method of claim 10, further comprising:

establishing a transmission control protocol (TCP) session with a server using a transmission control protocol/Internet protocol (TCP/IP) in the normal mode;

performing, by the communicator, an operation of maintaining the TCP session in the suspend mode; and receiving, by the communicator, a power-on packet from the server through the TCP session.

12. The method of claim 11, wherein the operation state change of the communicator includes at least one of occurrence of a link down event of the communicator or occurrence of a link up event of the communicator, and the operating method further comprises maintaining the TCP session without performing the operation even though the operation state change of the communicator occurring, based on the information with the first value.

13. The method of claim 12, wherein the maintaining of the TCP session includes maintaining the TCP session by skipping a process of closing a TCP socket.

14. The method of claim 10, further comprising:

transmitting a wake-up signal to the processor based on the communicator receiving a power-on packet from a server in the suspend mode; and resuming the processor based on the wake-up signal and controlling, by the processor, the communicator to be reset, wherein based on the communicator being reset, at least one of a link down event of the communicator or a link up event of the communicator occurring, wherein the skipping of the operation includes, based on the at least one of a link down event of the communicator or a link up event of the communicator occurring, skipping the operation based on the information with the first value.

15. The method of claim 14, further comprising:
in response to the power-on packet retransmitted from the server being received after the reset of the communicator is completed, by the communicator, transmitting the power-on packet retransmitted to the processor.

16. The method of claim 15, further comprising transmitting a response message to the server in response to receiving the power-on packet retransmitted.

17. The method of claim 15, further comprising terminating a TCP session with the server by performing a process of closing a TCP socket based on the operation state change of the communicator occurring in the normal mode occurring.

18. The method of claim 10, wherein the setting information with the first value includes, in response to receiving an input for switching the operation mode of the electronic device from the normal mode to the suspend mode, setting the information with the first value.

19. The method of claim 10, wherein the operation includes a process of closing a transmission control protocol (TCP) socket.

20. A non-transitory computer-readable recording medium having recorded thereon a program which, when executed by a computer of an electronic device comprising a communicator including communication circuitry, is to cause the electronic device to perform operations comprising:
operation state change of the communicator occurring, with a first value, wherein the first value represents the operation performed in response to the operation state change of the communicator occurring to be skipped based on the electronic device operating in a suspend mode;
in response to the operation state change of the communicator occurring based on the electronic device operating in the suspend mode, skipping the operation performed in response to the operation state change of the communicator occurring based on the information with the first value; and
in response to an operation mode of the electronic device being switched from the suspend mode to a normal mode, setting the information with a second value, wherein the second value represents the operation performed in response to the operation state change of the communicator occurring to be performed in response to the operation state change of the communicator occurring.

* * * * *